United States Patent
D'Angelo et al.

(10) Patent No.: US 9,936,464 B2
(45) Date of Patent: Apr. 3, 2018

(54) SYSTEM AND METHOD FOR IMPROVED TRANSMIT POWER ADAPTATION FOR WIRELESS PLATFORM

(71) Applicants: Wilfrid D'Angelo, Mougins (FR); Fabrice Labourasse, Sophia-Antipolis (FR); David Birnbaum, Modiin (IL); Izoslav Slava Tchigevsky, Portland, OR (US); Nawfal Asrih, Villeneuve-Loubet (FR)

(72) Inventors: Wilfrid D'Angelo, Mougins (FR); Fabrice Labourasse, Sophia-Antipolis (FR); David Birnbaum, Modiin (IL); Izoslav Slava Tchigevsky, Portland, OR (US); Nawfal Asrih, Villeneuve-Loubet (FR)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/026,536

(22) PCT Filed: Nov. 15, 2013

(86) PCT No.: PCT/US2013/070307
§ 371 (c)(1),
(2) Date: Mar. 31, 2016

(87) PCT Pub. No.: WO2015/073024
PCT Pub. Date: May 21, 2015

(65) Prior Publication Data
US 2016/0234790 A1 Aug. 11, 2016

(51) Int. Cl.
*H04B 7/00* (2006.01)
*H04W 52/34* (2009.01)
(Continued)

(52) U.S. Cl.
CPC ............ *H04W 52/34* (2013.01); *H04L 43/16* (2013.01); *H04W 52/367* (2013.01); *H04W 52/288* (2013.01)

(58) Field of Classification Search
CPC .... H04L 43/16; H04W 52/288; H04W 52/34; H04W 52/367
(Continued)

(56) References Cited

U.S. PATENT DOCUMENTS 6,603,773 B2  8/2003  Laakso et al.
8,934,939 B2  1/2015  Attar et al.
(Continued)

FOREIGN PATENT DOCUMENTS

| | | |
|---|---|---|
| RU | 2222117 C2 | 1/2004 |
| RU | 2011111419 A | 10/2012 |
| WO | 2012121797 A1 | 9/2012 |

OTHER PUBLICATIONS

International Preliminary Report on Patentability and Written Opinion received for PCT Application No. PCT/US2013/070307, dated May 26, 2016, 6 pages.
(Continued)

*Primary Examiner* — Tan H Trinh
(74) *Attorney, Agent, or Firm* — Grossman, Tucker, Perreault & Pfleger, PLLC (57) ABSTRACT

Generally, this disclosure provides devices, systems and methods for improved transmit power adaptation for platforms with wireless communication capability. A device may include a memory to store a first transmission (Tx) power level and a Tx power determination module to receive a second Tx power level from a device driver, the second Tx power level provided from a Basic Input/Output System (BIOS) associated with a platform hosting the device. The Tx power determination module may further determine a
(Continued)

third Tx power level based on a comparison of the first Tx power level and the second Tx power level. The device may further include a radio frequency (RF) transmission module to transmit a wireless signal at the third Tx power level.

7 Claims, 5 Drawing Sheets (51) Int. Cl.
H04W 52/36 (2009.01)
H04L 12/26 (2006.01)
H04W 52/28 (2009.01)

(58) Field of Classification Search
USPC ......... 455/69, 522, 133, 127, 575.1, 550.1, 455/90.1, 127.1, 115.1, 41.2, 103, 115.3; 370/311, 329, 347, 252; 713/323
See application file for complete search history.

(56) References Cited

U.S. PATENT DOCUMENTS

| | | | | |
|---|---|---|---|---|
| 2002/0136193 A1* | 9/2002 | Chang | ............... | H04W 52/262 370/347 |
| 2003/0099209 A1* | 5/2003 | Laakso | ............... | H04W 52/40 370/311 |
| 2004/0203485 A1* | 10/2004 | Lenchik | ............. | H04M 1/7258 455/90.1 |
| 2004/0209639 A1* | 10/2004 | Kamperschroer | .. | H04W 40/246 455/522 |
| 2005/0133467 A1* | 6/2005 | Trachewsky | ......... | H03G 3/3047 210/803 |
| 2005/0287974 A1* | 12/2005 | Zhou | .................. | H04B 17/318 455/226.2 |
| 2006/0199552 A1* | 9/2006 | Blech | .................. | H04B 17/13 455/127.1 |
| 2010/0291963 A1* | 11/2010 | Patel | .................. | H04W 52/367 455/522 |
| 2011/0317639 A1* | 12/2011 | Lee | ....................... | H04L 1/0015 370/329 |
| 2012/0021707 A1* | 1/2012 | Forrester | ............. | H04W 52/281 455/103 |
| 2012/0165010 A1 | 6/2012 | Lee et al. | | |
| 2012/0225663 A1 | 9/2012 | Gupta et al. | | |
| 2012/0270592 A1* | 10/2012 | Ngai | .................. | H04W 52/226 455/522 |
| 2013/0016684 A1 | 1/2013 | Attar et al. | | |
| 2013/0178178 A1* | 7/2013 | Lockerbie | .......... | H04W 52/367 455/127.1 |
| 2013/0318386 A1* | 11/2013 | Khatri | ................. | G06F 1/3203 713/323 |
| 2014/0029495 A1* | 1/2014 | Ise | .................... | H04W 52/0222 370/311 |
| 2015/0009902 A1* | 1/2015 | Emmanuel | ......... | H04W 52/283 370/329 |
| 2015/0063341 A1* | 3/2015 | Adachi | ................ | H04W 16/14 370/338 |

OTHER PUBLICATIONS

International Search Report and Written Opinion for related application PCT/US2013/070307 dated Dec. 17, 2013.
Russian Search Report received for Russian Patent Application No. 2016114828, dated Oct. 24, 2016, 2 pages of English translation and 3 pages of Russian Search Report.

* cited by examiner

SYSTEM AND METHOD FOR IMPROVED TRANSMIT POWER ADAPTATION FOR WIRELESS PLATFORM

FIELD

The present disclosure relates to transmit power adaptation, and more particularly, to improved transmit power adaptation for platforms with wireless communication capability.

BACKGROUND

Many types of platforms, such as computing, communication and entertainment systems or devices, increasingly include wireless communication capabilities. Typically, the platform is configured to include or accept a wireless communication module/circuit or network interface card (NIC) configured to provide communications over a wireless local area network (LAN or WLAN) or wireless wide area network (WAN or WWAN) using one or more communication protocols. Generally, the manufacturer of the platform and the manufacturer of the wireless communication module may be different entities. In some cases the platform vendor may install the wireless communication module while in other cases a re-seller or end user may install or replace the module.

Wireless communication modules generally require some form of regulatory certification, independent of the platform, for example to address potential health and safety concerns as well as interference issues related to radio frequency (RF) emissions. Transmit (Tx) power levels, that need to be declared to regulatory authorities, may be targeted to their intended platform family of products, for example laptops, notebooks or mobile phones. The Tx power levels may be chosen to comply with safety test targets such as specific absorption rate (SAR) tests, but these may depend on the type of platform and anticipated usage scenarios. One approach is to reduce the Tx power level of the wireless communications module to comply with a worst case scenario, but this may result in an undesirable performance reduction for many other types of platforms and/or applications. Another approach is to manufacture different versions of the wireless communication module, employing different Tx power levels, with each version targeted to a platform or family of platforms. This, however, creates logistical problems that may become unacceptably complex for large scale manufacturing and distribution operations.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides devices, systems and methods for improved transmit power adaptation for platforms with wireless communication capability. The platform, for example a tablet or mobile communication device, may include a Basic Input/Output System (BIOS) and memory that are associated with the platform hardware. The BIOS may be configured with a Tx power level table to store one or more Tx power levels, where each level is associated with an operational mode of the platform. In some embodiments, operational modes may include usage of the platform in portrait or landscape modes or other modes that may affect RF emission patterns from the platform.

The platform may also host or include a wireless communications module, for example a NIC, configured to transmit wireless RF signals from the platform. A device driver may be provided to interface between the BIOS (or other platform components) and the wireless communications module. The device driver may provide an indication of a desired Tx power level to the wireless communication module. The desired level may be selected by the BIOS, from the power level table, in accordance with a current operating mode. The wireless communication module may limit the power level for the transmitted RF signal to the desired Tx power level. In some embodiments, the wireless communication module may further limit the power level for the transmitted RF signal to a threshold maximum level that is stored in a one-time programmable (OTP) memory associated with the wireless communication module.

It will therefore be appreciated that the wireless communication module may be configured by a first party (e.g., manufacturer) with a selected maximum transmit power capability that may be appropriate for a relatively wide variety of potential applications, while the hosting platform may be configured by a second party to restrict transmit power to one or more lower levels based on anticipated usage of the platform. Additionally, in some embodiments, different levels may be dynamically selected from the BIOS power level table in response to changes in platform usage.

Figure 1:
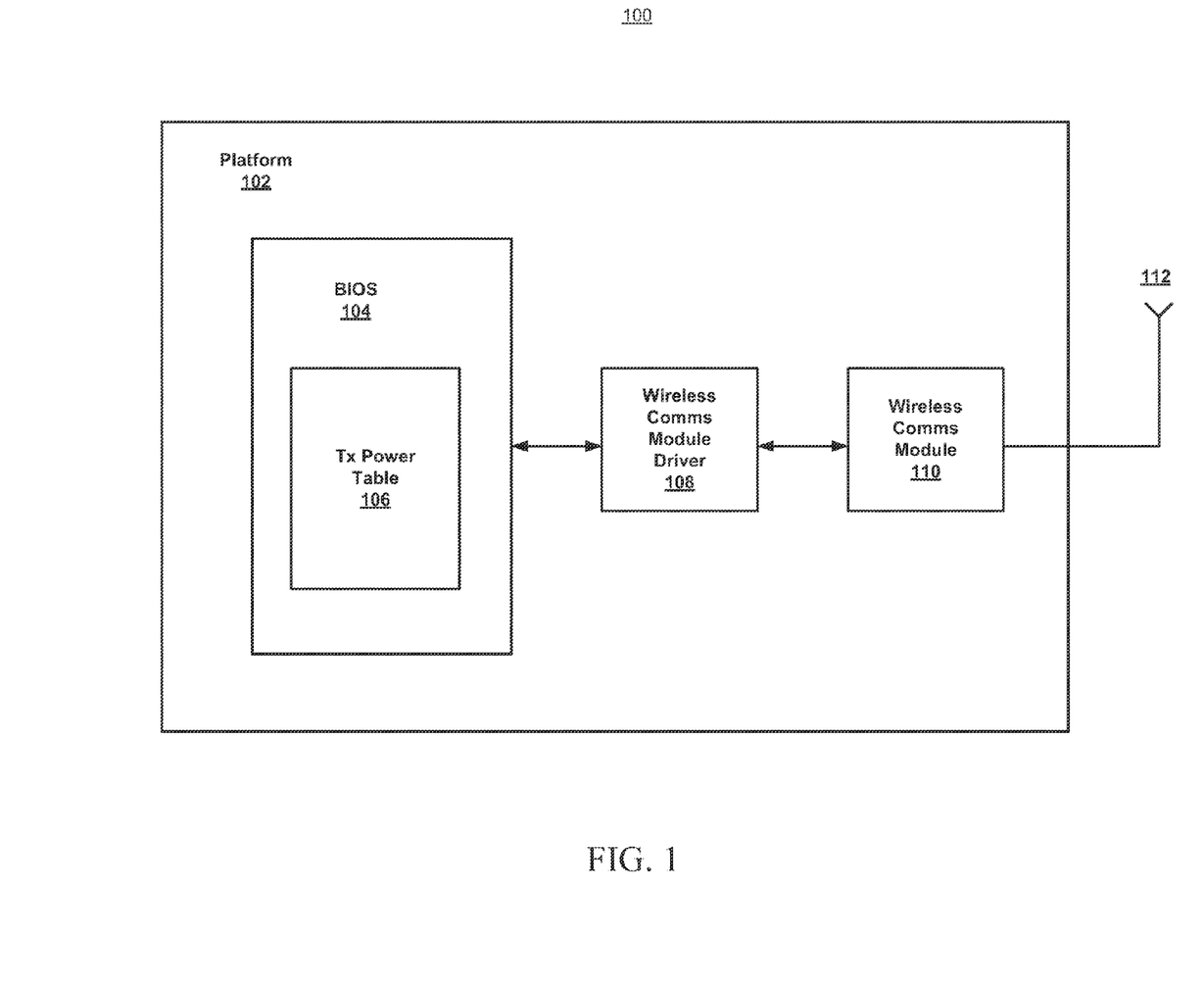
FIG. 1 illustrates a top level system diagram of one example embodiment consistent with the present disclosure.

FIG. 1 illustrates a top level system diagram 100 of one example embodiment consistent with the present disclosure. Platform 102 is shown to include a BIOS 104 which may further include a Tx power table 106, the operation of which will be explained in greater detail below. The BIOS 104 may be any type of code or instruction that is generally executed during a startup or a reboot of the platform 102, although it is not necessarily restricted to those occasions. The BIOS 104 may also be stored in a permanent or semi-permanent memory (e.g., non-volatile, electrically erasable programmable read-only memories or EEPROM, Flash, etc.) that is typically programmed and/or otherwise configured by the manufacturer or vendor of the platform. Platform 102 may also include a wireless communication module (or NIC) 110 and antenna 112. Additionally, a driver 108 may be provided and configured to interface between the BIOS 104 and the wireless communication module 110.

In some embodiments, the platform 102 may be a tablet, a laptop, a mobile communication device, a smart phone or a personal digital assistant. The wireless communication module 110 may be configured to transmit wireless signals in accordance with wireless protocols compatible with current or future versions of Third Generation (3G) mobile phones, Fourth Generation (4G) mobile phones, Bluetooth, Worldwide Interoperability for Microwave Access (Wi-Max), or Wireless Fidelity (Wi-Fi).

Figure 2:
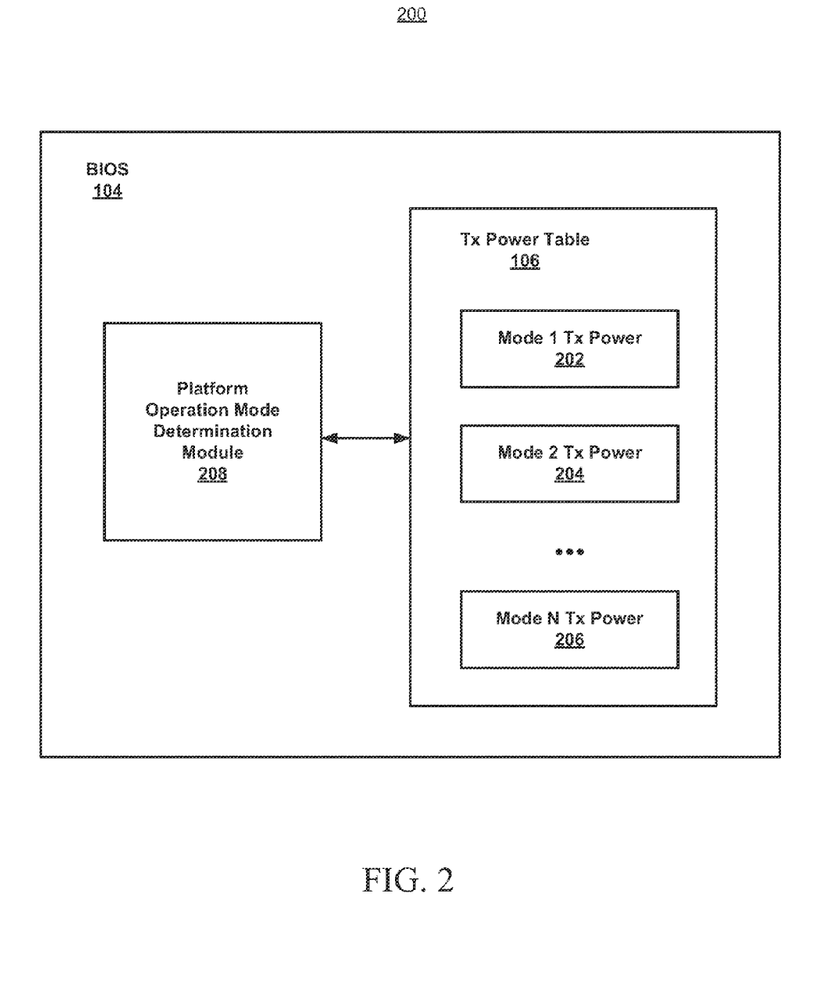
FIG. 2 illustrates a block diagram of one example embodiment consistent with the present disclosure.

FIG. 2 illustrates a block diagram 200 of one example embodiment consistent with the present disclosure. The BIOS 104 is shown to include a Tx Power Table 106 which may include any number of Tx power level entries 202, 204, 206, each associated with a mode of operation of the platform 102. The Tx power level entries 202, 204, 206 may be chosen to comply with regulatory certification for the platform 102, such as, for example, SAR safety tests. Because the orientation of the platform may affect both the RF emission patterns and the distance between the user and the antenna(s), different power levels may be appropriate for different orientations. For example, Mode 1 Tx Power level 202 may be associated with a landscape orientation use of the platform while Mode 2 Tx Power level 204 may be associated with a portrait orientation use of the platform. In some embodiments, portrait and landscape modes may be based on a physical orientation of the device or platform with respect to the user, particularly as this may affect the RF emission pattern relative to the user. Additional Tx power level modes may be associated with other orientations, such as, for example, a secondary landscape mode, a secondary portrait mode (e.g., reverse direction, or upside down, relative to the primary portrait and landscape modes) or other orientation combinations associated with flip screen devices and/or dual screen devices.

The BIOS 104 is also shown to include a Platform Operation Mode determination module 208 configured to determine the operating mode of the platform and select an entry from the Tx Power Table 106 that is associated with the determined mode. In some embodiments, the Platform Operation Mode determination module 208 may be external to the BIOS 104. In some embodiments, module 208 may employ motion sensors, orientation sensors and/or accelerometers, etc., to determine the operational mode (which may be a current, prior, or future predicted operational mode) of the platform 102. The selected entry from the Tx Power Table 106 may then be communicated to the wireless communication module 110, for example through the driver 108.

Figure 3:
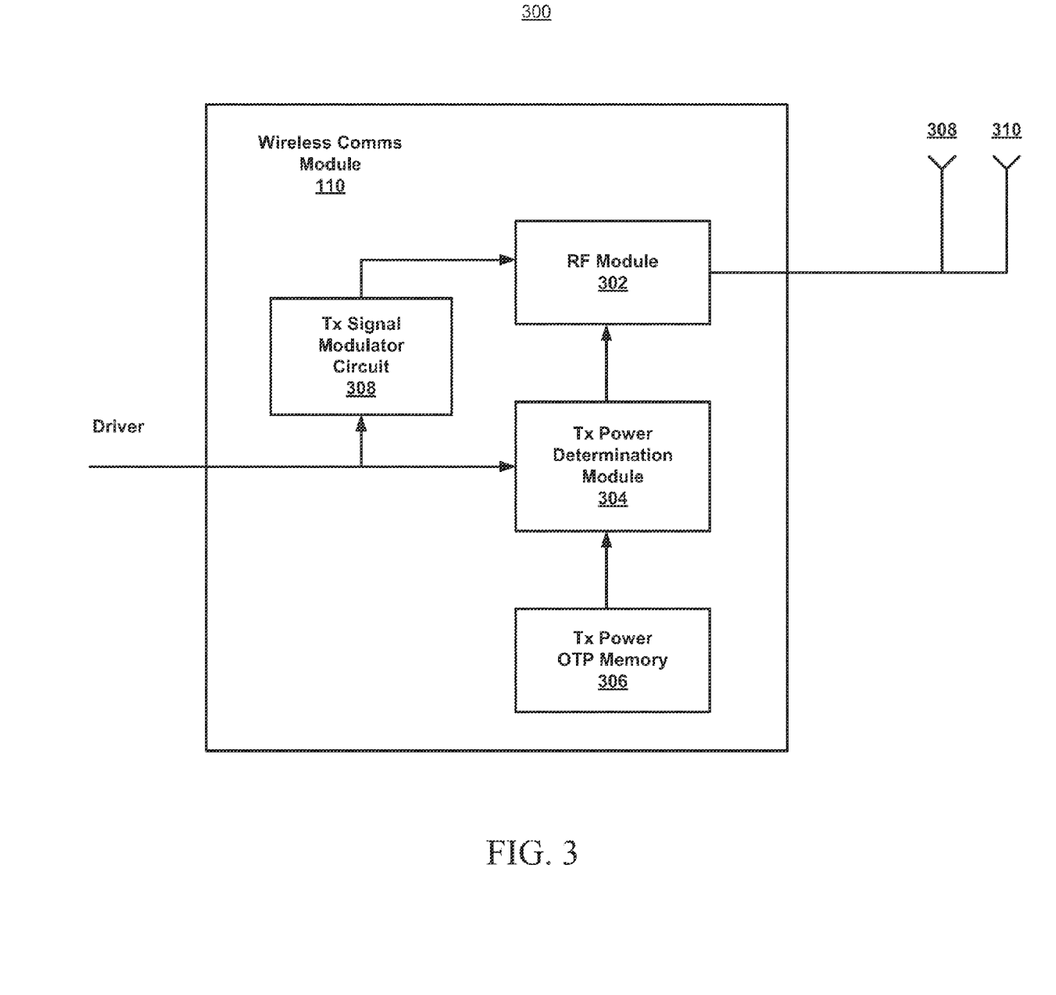
FIG. 3 illustrates a block diagram of another example embodiment consistent with the present disclosure.

FIG. 3 illustrates a block diagram 300 of another example embodiment consistent with the present disclosure. The wireless communication module 110 is shown to include an RF module 302, a Tx power determination module 304, a Tx power OTP memory 306 and a Tx signal modulator circuit 308. Additionally, antenna 112 may include one or more antenna elements 308, 310 which may be configured as an antenna array and may form part of a Multiple Input Multiple Output (MIMO) antenna system. Tx power OTP memory 306 (e.g., EEPROM, Flash, etc.) may be configured to store a maximum Tx power level threshold associated with the wireless communication module 110. In some embodiments, this maximum Tx power level threshold may be determined and programmed into the OTP memory 306 by a manufacturer (vendor, supplier, etc.) of the wireless communication module 110.

The Tx power determination module 304 may be configured to receive a selected or desired transmit power level from the device driver 108, which, in turn, may be provided by the BIOS 104 and/or other components of the platform 102. The Tx power determination module 304 may further be configured to compare this platform selected power level to the maximum Tx power level threshold to generate a determined or "actual" Tx power level to be provided to RF module 302. In some embodiments, the determined Tx power level may be the minimum of the platform selected level and the maximum level.

Tx signal modulator circuit 308 may be configured to receive a signal to be transmitted (e.g., from device driver 108) and modulate that signal to a format suitable for transmission by RF module 302 at the determined Tx power level.

Figure 4:
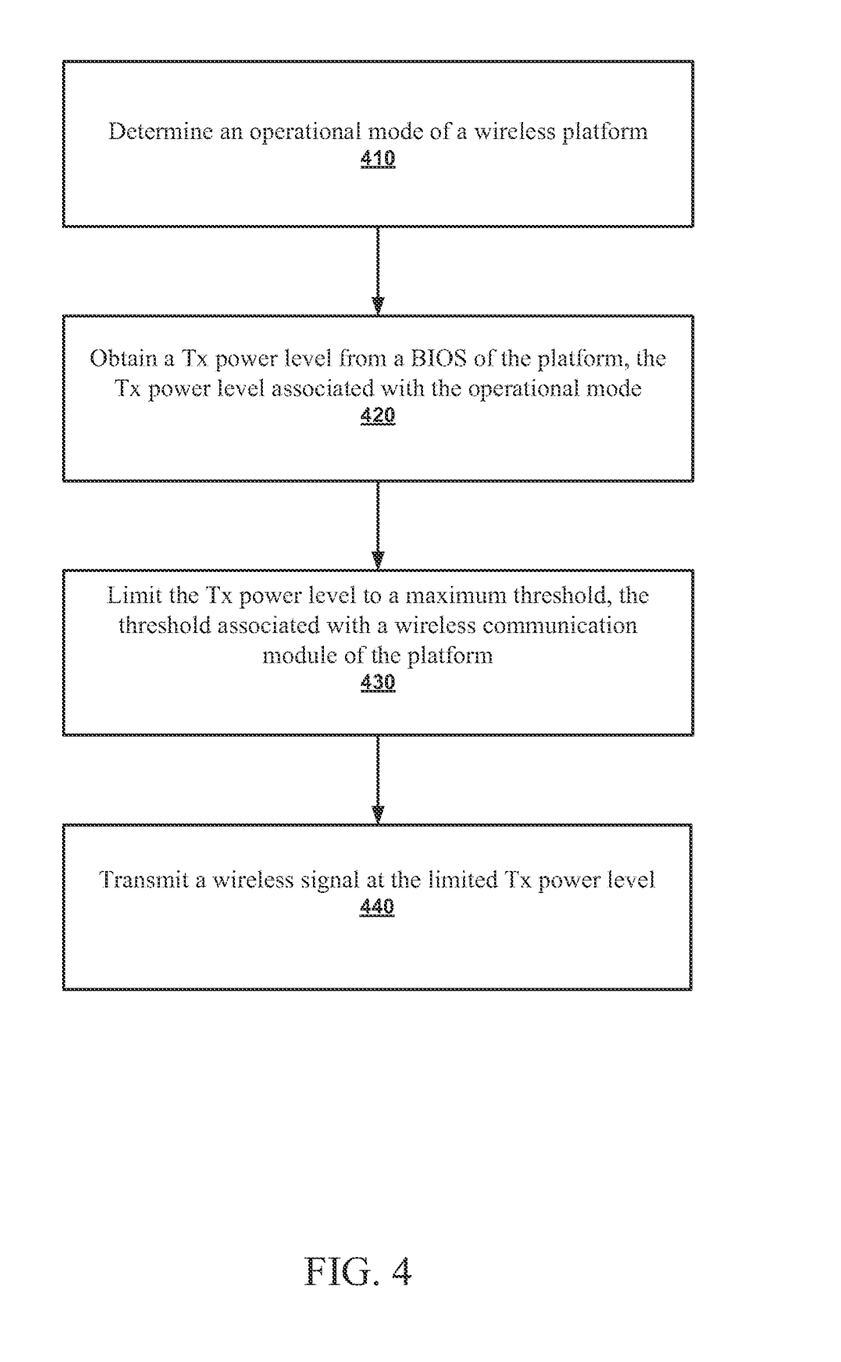
FIG. 4 illustrates a flowchart of operations of one example embodiment consistent with the present disclosure.

FIG. 4 illustrates a flowchart of operations 400 of another example embodiment consistent with the present disclosure. At operation 410, an operational mode of a wireless platform is determined. The operational mode may include a landscape mode and a portrait mode. At operation 420, a Tx power level is obtained from a BIOS of the platform. The Tx power level is associated with the operational mode. At operation 430, the Tx power level is limited to a maximum threshold. The maximum threshold is associated with a wireless communication module of the platform. In some embodiments, this maximum threshold may be the maximum Tx power level stored in OTP memory 306. At operation 440, a wireless signal is transmitted at the limited Tx power level.

Figure 5:
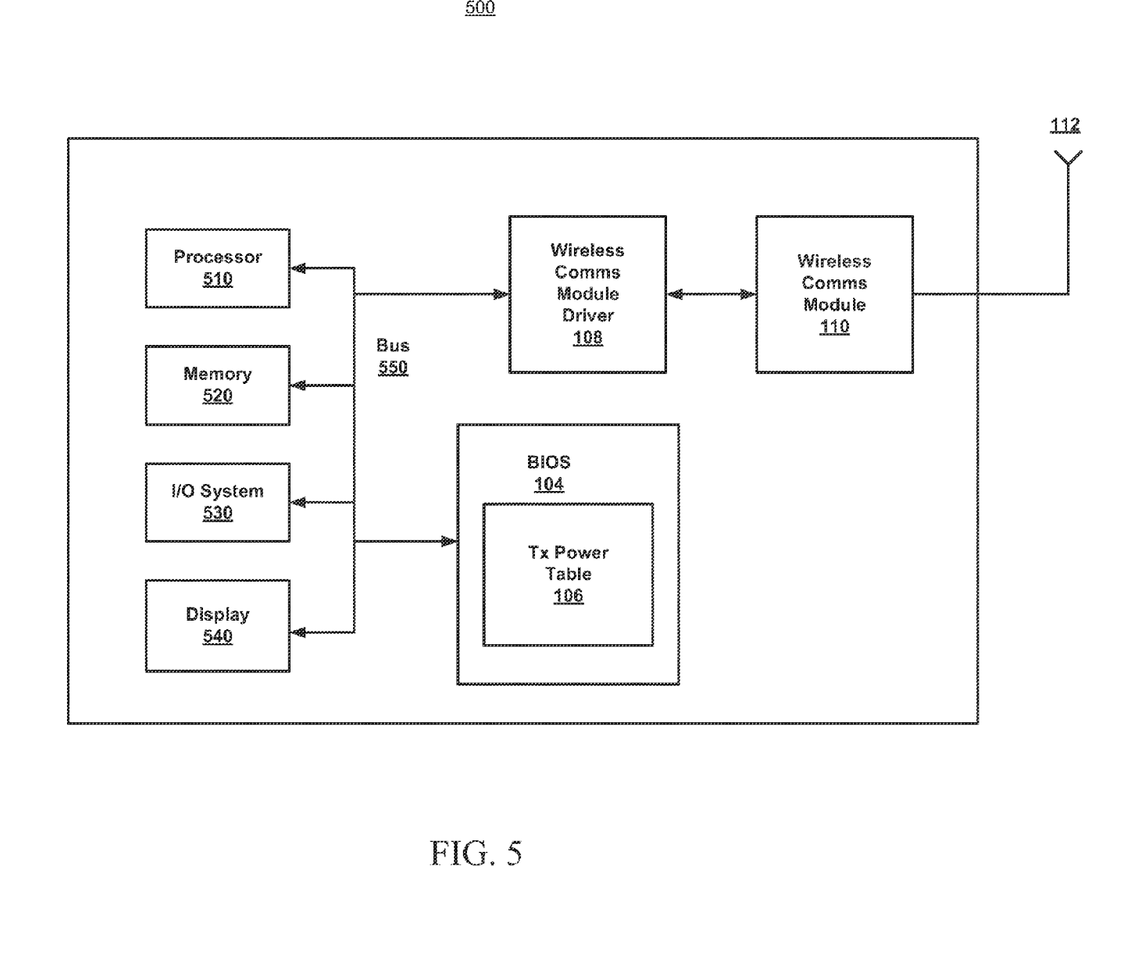
FIG. 5 illustrates a platform of one example embodiment consistent with the present disclosure.

FIG. 5 illustrates a platform 500 of one example embodiment consistent with the present disclosure. Platform 500 is shown to include a processor 510, memory 520, an input/output (I/O) system 530, a display/keyboard or other type of user interface (UI) 540 such as, for example, a touchscreen. Platform 500 may also include a wireless communications module 110, a wireless communications module device driver 108 and a BIOS 104 configured to store a TX power table 106. Any or all components of platform 500 may be interconnected by a bus 550 or other suitable means. Platform 500 may further include one or more antennas 112 which may form part of a Multiple Input Multiple Output (MIMO) antenna system. The platform 500 may be a mobile communication device, such as, for example, a smartphone, a tablet, a laptop computing device or any other device configured to transmit wireless signals.

Examples of platform 500 may include, but are not limited to, a mobile communication device such as a cellular handset or a smartphone based on the Android® OS, iOS®, Windows® OS, Blackberry® OS, Palm® OS, Symbian® OS, etc., a mobile computing device such as a tablet computer like an iPad®, Surface®, Galaxy Tab®, Kindle Fire®, etc., an Ultrabook® including a low-power chipset manufactured by Intel Corporation, a netbook, a notebook, a laptop or a palmtop.

In platform 500, processor 510 may comprise one or more processors situated in separate components, or alternatively, one or more processing cores embodied in a single component (e.g., in a System-on-a-Chip (SoC) configuration) and any processor-related support circuitry (e.g., bridging interfaces, etc.). Example processors may include, but are not limited to, various x86-based microprocessors available from the Intel Corporation including those in the Pentium, Xeon, Itanium, Celeron, Atom, Core i-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which processor 510 may interact with other system components that may be operating at different speeds, on different buses, etc. in platform 500. Some or all of the functionality commonly associated with the support circuitry may also be included in the same physical package as the processor (e.g., such as in the Sandy Bridge family of processors available from the Intel Corporation).

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may comprise, for example, singly or in any combination, hardwired circuitry, programmable circuitry, state machine circuitry, and/or firmware that stores instructions executed by programmable circuitry. An app may be embodied as code or instructions which may be executed on programmable circuitry such as a host processor or other programmable circuitry. A module, as used in any embodiment herein, may be embodied as circuitry. The circuitry may be embodied as an integrated circuit, such as an integrated circuit chip.

Thus, the present disclosure provides devices, methods, systems and computer-readable storage medium for improved transmit power adaptation for platforms with wireless communication capability. The following examples pertain to further embodiments.

The device may include a memory to store a first transmission (Tx) power level. The device of this example may also include a Tx power determination module to receive a second Tx power level from a device driver, the second Tx power level provided from a Basic Input/Output System (BIOS) associated with a platform hosting the device. The Tx power determination module further to determine a third Tx power level based on a comparison of the first Tx power level and the second Tx power level. The device of this example may further include a radio frequency (RF) transmission module to transmit a wireless signal at the third Tx power level.

Another example device includes the forgoing components and the second Tx power level is associated with a selected operating mode of the device.

Another example device includes the forgoing components and the operating mode is selected from the group consisting of a landscape mode and a portrait mode.

Another example device includes the forgoing components and the memory is a one-time programmable memory and the first Tx power level is pre-determined for the device.

Another example device includes the forgoing components and the third Tx power level is determined as the minimum of the first Tx power level and the second Tx power level.

Another example device includes the forgoing components and further includes a Tx signal modulator circuit to modulate a signal received from the device driver and to provide the modulated signal to the RF transmission module.

Another example device includes the forgoing components and further includes an antenna coupled to the RF transmission module, the antenna including one or more antenna elements.

Another example device includes the forgoing components and the wireless signal is a Third Generation (3G) mobile phone signal, a Fourth Generation (4G) mobile phone signal, a Bluetooth signal, a Worldwide Interoperability for Microwave Access (WiMax) signal, or a Wireless Fidelity (Wi-Fi) signal.

According to another aspect there is provided a method. The method may include determining an operational mode of a wireless platform. The method of this example may also include obtaining a Tx power level from a BIOS of the platform, the Tx power level associated with the operational mode. The method of this example may further include limiting the Tx power level to a maximum threshold, the threshold associated with a wireless communication module of the platform. The method of this example may further include transmitting a wireless signal at the limited Tx power level.

Another example method includes the forgoing operations and the operational mode is selected form the group consisting of a landscape mode and a portrait mode.

Another example method includes the forgoing operations and further includes selecting the Tx power level from a plurality of operational mode Tx power levels, the plurality of power levels stored in a table associated with the BIOS.

Another example method includes the forgoing operations and the maximum threshold is stored in a one-time programmable memory of the wireless communication module.

Another example method includes the forgoing operations and the wireless signal is a 3G mobile phone signal, a 4G mobile phone signal, a Bluetooth signal, a WiMax signal, or a Wi-Fi signal.

According to another aspect there is provided a wireless communications platform. The platform may include a processor; an input/output module coupled to the processor; and a memory coupled to the processor. The platform of this example may also include a BIOS to store one or more Tx power levels, each of the Tx power levels associated with an operational mode of the platform. The platform of this example may further include a wireless communications module including: a one-time programmable memory to store a maximum Tx power level threshold associated with the wireless communications module; a Tx power determination module to receive a selected one of the Tx power levels from the BIOS and to limit the selected Tx power level to the threshold; and a radio frequency (RF) transmission module to transmit a wireless signal at the limited Tx power level.

Another example platform includes the forgoing components and the operational mode is selected from the group consisting of a landscape mode and a portrait mode.

Another example platform includes the forgoing components and the wireless signal is a 3G mobile phone signal, a 4G mobile phone signal, a Bluetooth signal, a WiMax signal, or a Wi-Fi signal.

Another example platform includes the forgoing components and the platform is a smart phone, a smart tablet or a personal digital assistant.

Another example platform includes the forgoing components and further includes a touch screen display coupled to the input/output module.

According to another aspect there is provided a system. The system may include a means for determining an operational mode of a wireless platform. The system of this example may also include a means for obtaining a Tx power level from a BIOS of the platform, the Tx power level associated with the operational mode. The system of this example may further include a means for limiting the Tx power level to a maximum threshold, the threshold associated with a wireless communication module of the platform. The system of this example may further include a means for transmitting a wireless signal at the limited Tx power level.

Another example system includes the forgoing components and the operational mode is selected form the group consisting of a landscape mode and a portrait mode.

Another example system includes the forgoing components and further includes means for selecting the Tx power level from a plurality of operational mode Tx power levels, the plurality of power levels stored in a table associated with the BIOS.

Another example system includes the forgoing components and the maximum threshold is stored in a one-time programmable memory of the wireless communication module.

Another example system includes the forgoing components and the wireless signal is a 3G mobile phone signal, a 4G mobile phone signal, a Bluetooth signal, a WiMax signal, or a Wi-Fi signal.

According to another aspect there is provided at least one computer-readable storage medium having instructions stored thereon which when executed by a processor, cause the processor to perform the operations of the method as described in any of the examples above.

According to another aspect there is provided an apparatus including means to perform a method as described in any of the examples above.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A device for wireless communications, comprising:
   a memory to store a first transmission (Tx) power level;
   a Tx power determination circuitry to receive a second Tx power level from a device driver, said second Tx power level provided from a Basic Input/Output System (BIOS) associated with a platform hosting said device;
   said Tx power determination circuitry further to determine a third Tx power level based on a comparison of said first Tx power level and said second Tx power level, wherein said third Tx power level is determined as the minimum of said first Tx power level and said second Tx power level; and
   a radio frequency (RF) transmission circuitry to transmit a wireless signal at said third Tx power level.

2. The device of claim 1, wherein said second Tx power level is associated with a selected operating mode of said device.

3. The device of claim 2, wherein said operating mode is selected from the group consisting of a landscape mode and a portrait mode.

4. The device of claim 1, wherein said memory is a one-time programmable memory and said first Tx power level is pre-determined for said device.

5. The device of claim 1, further comprising a Tx signal modulator circuit to modulate a signal received from said device driver and to provide said modulated signal to said RF transmission module.

6. The device of claim 1, further comprising an antenna coupled to said RF transmission module, said antenna comprising one or more antenna elements.

7. The device of claim 1, wherein said wireless signal is a Third Generation (3G) mobile phone signal, a Fourth Generation (4G) mobile phone signal, a Bluetooth signal, a Worldwide Interoperability for Microwave Access (WiMax) signal, or a Wireless Fidelity (Wi-Fi) signal.

* * * * *